United States Patent [19]

Schoening et al.

[11] 4,380,085
[45] Apr. 12, 1983

[54] ANGLED GAS CONDUIT

[75] Inventors: Josef Schoening, Hambruecken; Hans-Georg Schwiers, Ketsch; Claus Elter, Bad Durkheim; Wilfried Stracke, Oftersheim; Reinhard Mauersberger, Juelich, all of Fed. Rep. of Germany

[73] Assignee: Hochtemperatur-Reaktorbau GmbH, Cologne, Fed. Rep. of Germany

[21] Appl. No.: 136,271

[22] Filed: Apr. 1, 1980

[30] Foreign Application Priority Data

Apr. 4, 1979 [DE] Fed. Rep. of Germany ....... 2913461
Apr. 4, 1979 [DE] Fed. Rep. of Germany ....... 2913462

[51] Int. Cl.³ .......................... G21C 3/56; F15D 1/04
[52] U.S. Cl. .................................. 376/381; 376/379; 138/39
[58] Field of Search ................. 176/58 PB, 60, 84; 376/381, 383, 389, 390, 399, 400; 138/37, 39

[56] References Cited

U.S. PATENT DOCUMENTS

| 3,820,570 | 6/1974 | Holzhuter | 138/39 |
| 3,929,188 | 12/1975 | Brinkmann et al. | 176/60 |
| 4,019,537 | 4/1977 | Bonnard et al. | 138/39 |
| 4,118,276 | 10/1978 | Hodzic et al. | 176/60 |
| 4,121,973 | 10/1978 | Mysels et al. | 176/84 |
| 4,202,732 | 5/1980 | Jung et al. | 176/60 |
| 4,234,384 | 10/1980 | Fritz et al. | 176/58 PB |
| 4,270,577 | 6/1981 | Brown et al. | 138/39 |

FOREIGN PATENT DOCUMENTS

| 1013926 | 3/1962 | United Kingdom . |
| 1035134 | 4/1964 | United Kingdom . |

Primary Examiner—Sal Cangialosi
Attorney, Agent, or Firm—Schwartz, Jeffery, Schwaab, Mack, Blumenthal & Koch

[57] ABSTRACT

Disclosed is an angled gas conduit for a gas flowing under high pressure and at an elevated temperature which comprises a first conduit part and second conduit part connected at an angle forming an area of deflection for gas flowing within said conduit parts, an apertured plate arranged at an oblique angle within said conduit in the area of deflection, the apertured plate having a plurality of circular passages for directing the flow of gas in the conduit. A mounting arrangement for the apertured plate is also disclosed.

17 Claims, 4 Drawing Figures

ANGLED GAS CONDUIT

BACKGROUND OF THE INVENTION

1. Field of the Invention

The invention relates to an angled gas conduit for a high pressure and high temperature gas flowing at a high velocity. More particularly, the invention concerns a device for the connection of the hot gas collector space of a gas cooled high temperature reactor with a component of the cooling gas circuit. The angled gas conduit may also be equipped with internal insulation.

2. Background of the Prior Art

It is well known in the art to separate the part of a gas cooled nuclear reactor installation containing the core of the reactor from the part containing components of the primary circuit, such as for example steam generators housed in common pressure vessels by means of shielding devices. This prevents the activation of these components by direct neutron irradiation. Furthermore, measures are known to permit the cooling gas to flow without appreciable drop in pressure from the reactor core to the components of the primary circuit, without the passage of harmful radiation through the free cross section of the gas conduit connecting the reactor core with the components.

In West German Published Application No. 10 83 945, a reactor core shield is described, comprising a cylindrical inner piece and an external shielding annulus, which together with a further shielding annulus forms an S-shaped flow path for the cooling medium. This shielding device requires a great expenditure of material.

In West German Offenlegungsschrift No. 1 464 705 a tubular conduit is described. The tubular conduit emerges from the reactor core. It displays an expanded part in the area of its passage through the reactor container. A shielding block is built into this expanded part. The shielding block covers the cross section of the conduit and the flow of gas or fluid is conducted around the shielding block. This type of shielding has the disadvantage that the cross section of the conduit must be enlarged in the area of the shielding block.

In West German Offenlegungsschrift No. 2 257 699, a bent piece of tubular conduit of relatively large diameter for a rapidly flowing medium is described. A lattice of blades is installed at the location of the bend in order to improve the flow profile.

Arrangements to improve the mixing of the hot cooling gas in a nuclear reactor have been proposed. These, however, are arranged within the hot gas collector space located beneath the core of the reactor and effect the equalization of the temperature profile prior to the entry of the flow of gas into the hot gas conduits.

One of these arrangements consists of a V-shaped displacement body installed in front of each hot gas conduit on the floor of the hot gas collector space. The displacement bodies are intended to direct the flow of the hot gas upwards.

In the case of another installation, satisfactory mixing of the hot cooling gas is obtained by arranging round columns in the hot gas collector space and supporting the bottom reflector. These are in the form of hollow columns. The inner space of the hollow columns is connected on the one hand by means of radial bores with the hot gas collector and is in communication on the other hand with cooling gas passages in the bottom reflector.

In addition to other measures, it is customary to bend the gas conduit following its passage through a shielding wall, i.e. to use an angled gas conduit. The conduit may be bent as much as 90° in known reactor arrangements.

This is true, for example, in the base of THTR-300 MWe, wherein the gas heated in the core of the reactor is collected in a hot gas collector space and conducted through respective gas conduits to the steam generators. The gas conduits initially pass horizontally through the thermal shield and are then bent upwards at an angle of 90° so that they may be connected with the jacket of one of the steam generators.

In such gas conduits, the deflection of the flow of gas in the angled section of the gas conduit leads to the establishment of nonuniform velocity and temperature distributions. The first results in unfavorable inflow conditions in the reactor component attached to the gas conduit, subsequently leading to overstressing and, thus to the destruction of parts in the lower areas of this component. Non-uniform temperature profiles create hot strands of differing temperatures in the flow of gas, which must again be avoided.

SUMMARY OF THE INVENTION

It is one object of the present invention to design the above-described angled gas conduit in a manner such that a uniform flow and temperature profile is obtained in the angled partial section without appreciably increasing the loss of pressure.

It is another object of the present invention to design the angled gas conduit such that it remains capable of functioning for a longer period of time at elevated temperatures and in a helium atmosphere and such that it can be easily accessible of maintenance and repairs.

The objects of this invention are attained by the installation of an apertured plate obliquely at the location of deflection in the gas conduit. The apertured plate covers the largest cross section encountered at the deflecting location. The apertured plate preferably displays circular passages arranged parallel to the wall of the angled partial section of the gas conduit.

Certain objects of this invention are attained by an arrangement of the apertured plate wherein it is supported on at least three supporting bolts arranged in the wall of the gas conduit. Each supporting bolt protrudes into a recess open in the downward direction of the circumferential surface of the apertured plate and carries a ball joint at this end. An insert in the shape of a half shell is arranged in the recesses. The apertured plate rests on the respective ball joint in these inserts.

This type of mounting represents a secure and operational mounting for the apertured plate even in a helium atmosphere and under the prevailing pressures and temperatures. The mounting permits a plurality of sliding movements due to thermal expansion and makes the removal of the apertured plate possible.

The apertured plate must be removable to enable access to the internal insulation of the angled gas conduit in instances when repair work is necessary. On the other hand, it must also be safely and functionally secured in the apparatus. Manufacturing tolerances of the mounting are compensated for by the ball joints.

As demonstrated by experiments performed with the gas conduit according to the invention, the apertured plate provides a flow velocity distributed uniformly over the entire cross section of the gas conduit after the deflection, while introducing only a very slight pressure loss. Local differences in velocity are compensated to the extent that uniform flow is assured through a component, for example, a steam generator, following the gas conduit in series. In addition to this improvement in the conditions of the flow entering the component following the conduit, an equalization of the temperature profile is also obtained. This is, because the apertured plate effects an improved mixing of the gas. The formation of hot strands in the flow of gas is prevented by the apertured plate.

Advantageously, the apertured plate has a thickness in relation to its surface area such that it simultaneously may serve as shielding against radiation. There are, therefore, no additional shielding devices required within the gas conduit. The shielding effect is provided by the oblique arrangement of the apertured plate and the passages through the apertured plate which are inclined with respect to the front surfaces of the plate, together with the favorable ratio of the diameter of said passages to their length.

In the case of a relatively thick apertured plate, it may be appropriate to arrange the lateral limiting surface of the plate parallel to the wall of the angled partial section of the gas conduit.

The apertured plate may be made of metallic or ceramic materials. The selection of the material is dependent upon the pressure distributions expected to prevail in the gas conduit.

Advantageously, the passages provided in the apertured plate are of the same diameter and are distributed over the apertured plate in a regular pattern. The optimum diameter of the passages may be determined by means of flow experiments while varying the local flow resistances. Adequately tempered velocity profiles (with maximum local velocity differences of approximately ±10% with respect to a mean velocity) are obtained with an apertured plate having a free surface area of at least 50%. An aperture plate with a dense perforation pattern also has the additional advantage that only slight stationary thermal stresses are generated and that non-stationary thermal stresses are largely prevented. In a gas conduit without the apertured plates, the deviation of local velocities from the mean velocity may exceed 100% in certain areas.

A particularly advantageous application of the apertured plate is found in an angled gas conduit having partial sections located in front and behind the deflection point of different cross-sectional shapes. The first partial section, for example, may have a rectangular cross section, while the angled partial section is circular.

In another especially advantageous embodiment, the large pressure differences in a gas conduit may be compensated by the type of mounting. That is, each of the half shell-like inserts in the recesses of the apertured plate and also the external ring of each supporting bolt ball joint contain an insert of a hard material (for example, P 30). The hard material inserts form the rest or wear locations for the apertured plate. All of the hard material inserts are coated with TiC.

It is advantageous to provide a cooling device for each supporting belt in order to keep the mounting of the apertured plate operating for the longest possible period of time.

Each supporting bolt may consist of a hollow, cylindrical external part and a mandrel-like internal part arranged in the outer part. The hollow cylindrical part narrows on its end facing the apertured plate to a journal upon which the ball joint is arranged. The journal in turn rests upon the end of the mandrel-like internal part.

Between the external part and the internal part of each supporting bolt, thermal insulation is provided. This insulation is a part of the cooling arrangement for the bolt. The cooling arrangement additionally comprises a cooling plate exposed to a flow of cold gas and arranged at the end of the mandrel-like internal part facing away from the perforated plate. The cooling plate acts to draw away heat from the ball joint through the mandrel-like internal part.

In one advantageous embodiment, at least one end of the gas conduit is arranged in a sliding manner in order to prevent stresses due to thermal expansion.

BRIEF DESCRIPTION OF THE DRAWINGS

In the drawings, examples of the gas conduit according to the invention are represented schematically.

The figures are representative of the following.

DETAILED DESCRIPTION OF THE PREFERRED EMBODIMENTS

Figure 1:
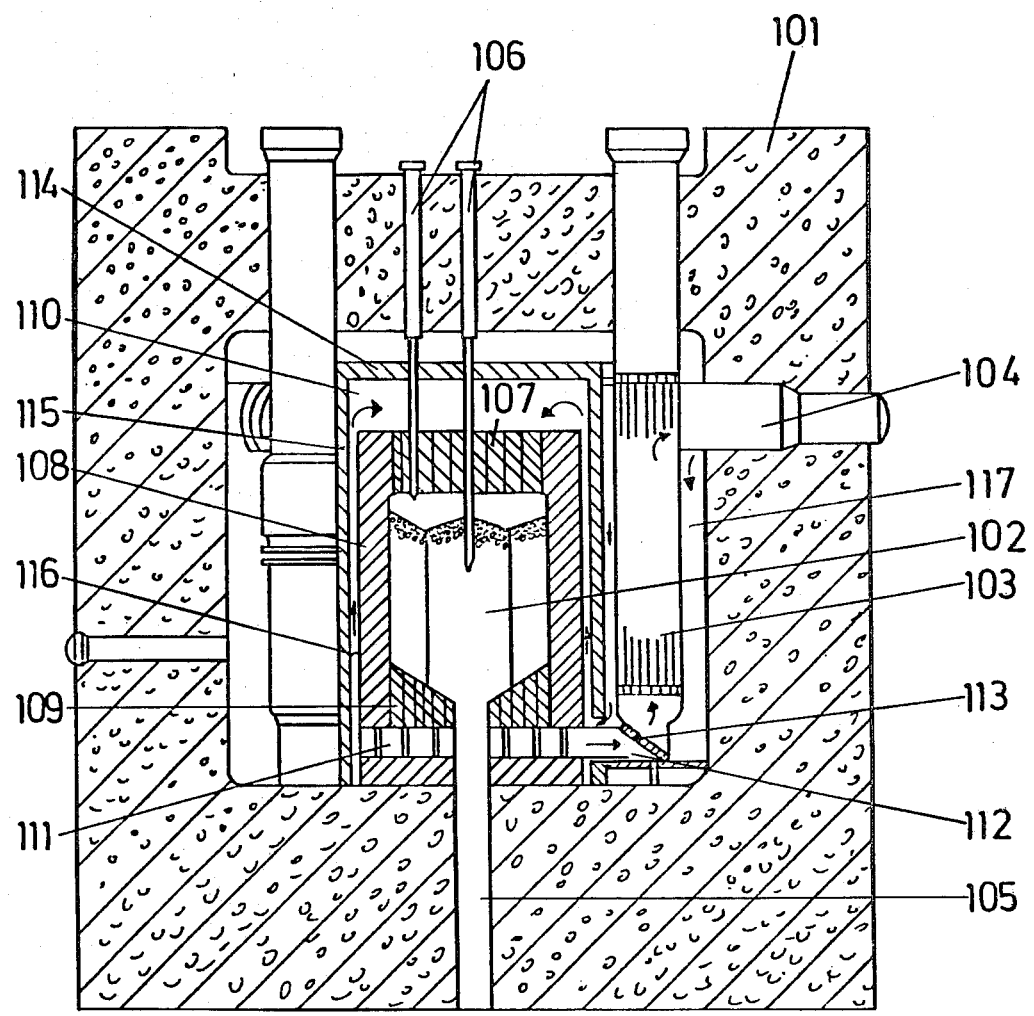
FIG. 1 shows a side view cross section of a nuclear reactor installation equipped with a gas conduit.

The nuclear reactor installation shown in FIG. 1 comprises essentially a reinforced concrete pressure vessel 101 with a cavity housing the reactor core 102. A plurality of components for the nuclear reactor and power plant are also housed in the vessel. FIG. 1, however, shows only one steam generator 103 and blower 104 needed for the circulation of the cooling gas. The reactor core 102 contains a pile of spherical fuel elements, which are added at the top of the core area by an inlet (not shown) and drawn off at the bottom by means of the removal tube 105. The reactor is controlled and regulated by means of absorber rods 106 which are inserted directly into the core area.

The reactor core 102 is surrounded by a reflector formed by a roof reflector 107, a cylindrical side reflector 108 and a bottom reflector 109. The roof and bottom reflectors have passages for the cooling gas. A cold gas collector space 110 is located above the roof reflector 107 and a hot gas collector space 111 is located underneath the bottom reflector 109. Several gas conduits (not shown) are attached to the hot gas collector space. One of these gas conduits 112 is shown as an angled conduit connecting the hot gas collector space 111 with the steam generator 103. Additional angled gas conduits also connect the hot gas collector space 112 with other steam generators (not shown). At the point of deflection of each gas conduit 112, an aperture plate 113 is installed in an oblique manner. This installation shall be described in more detail in FIGS. 2 through 4.

Around the reflector, a thermal shield comprising a side shield 115 and a roof shield 114 is arranged. Between the side reflector 108 and the thermal side shield 115 an annular space 116 is created. The cooled cooling gas coming from the blower 104 is passed through this annular space to the cold gas collector space 110, after flowing downward in a free space 117 past the steam generators 103.

The gas conduit 112 is welded at its upper end to a jacket of the steam generator 103, while the other end is inserted slidingly in the outer wall of the cylindrical side reflector 108. This connection is also secured with a suitable securing means such as foil.

Figure 2:
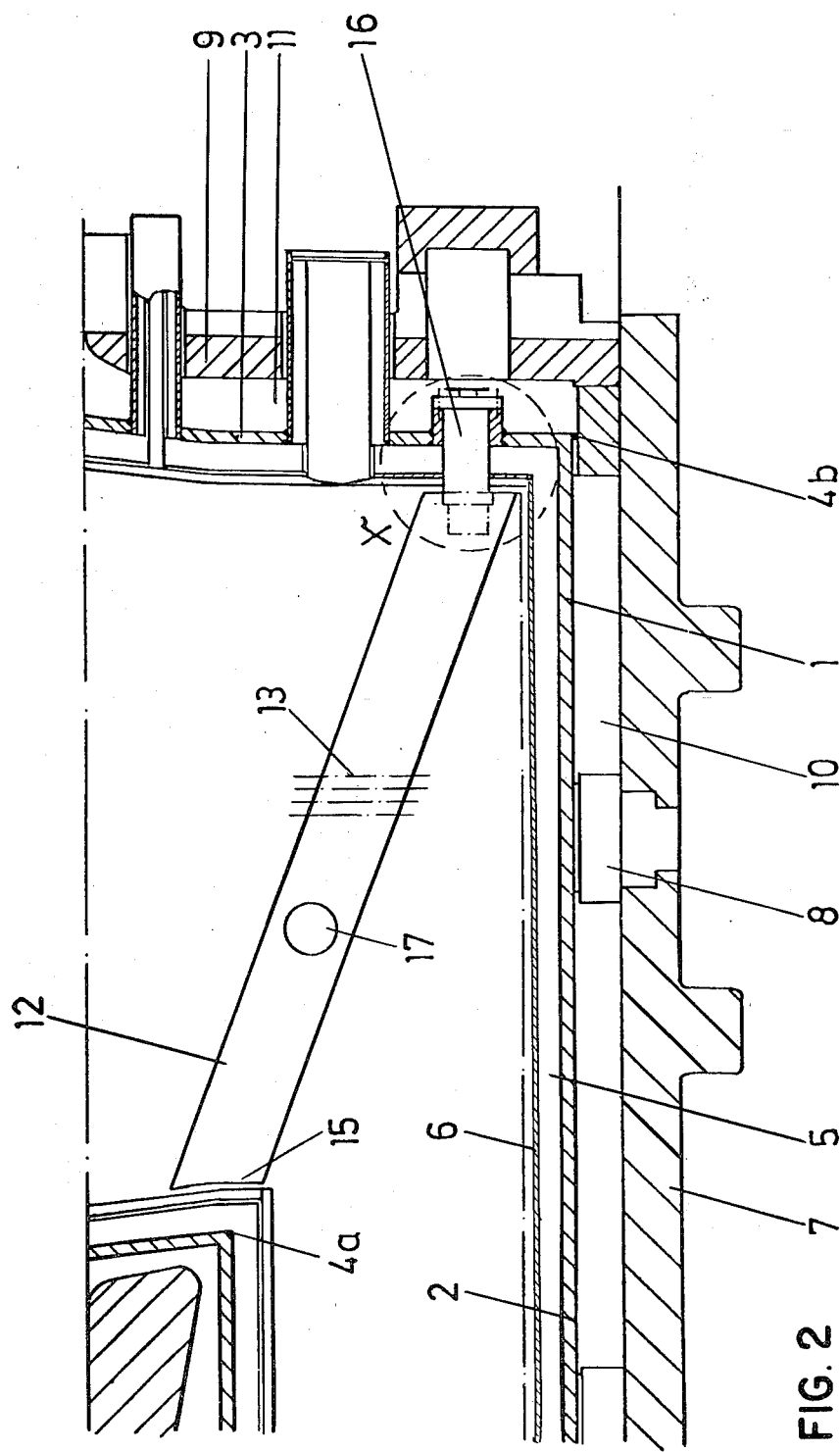
FIG. 2 displays a longitudinal cross section through the gas conduit on the line I—I of FIG. 3.
Figure 3:
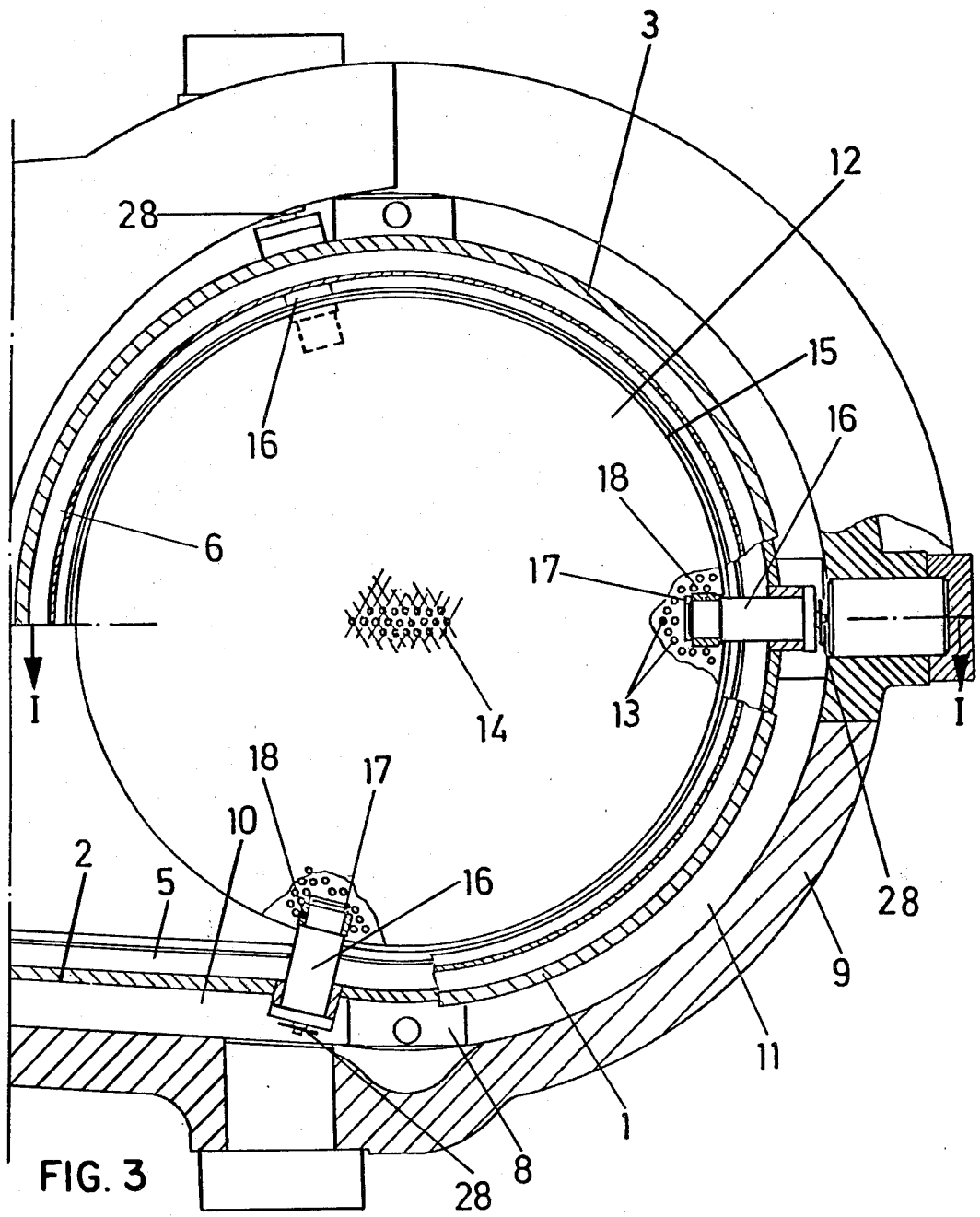
FIG. 3 represents a top view of the section of the gas conduit shown in FIG. 2.

FIGS. 2 and 3 show a portion of a gas conduit 1, corresponding to a portion of the gas conduit 112 in FIG. 1. Referring to FIG. 2 the conduit portion depicted consists of a first, horizontally arranged conduit section 2 and a second conduit section 3 bent upwards by an angle of 90° with respect to section 2. Section 3 is to be referred to as the angled section. The point of deflection of the conduit is designated by 4a, 4b. The gas conduit 1 is provided inside with a metal foil insulation 5, having a cover 6 serving as a gas guide skirt.

The horizontal conduit section 2 of the gas conduit 1 has a rectangular cross section and rests by means of support element 8 on a shield 7 made of graphite.

The graphite shield is supported on the floor of the reactor cavity (not shown) in FIG. 2. The angled conduit section 3 having a circular cross section, is inserted with its lower area movably in a further shield 9, arranged between the angled conduit section 3 and the wall of the reactor cavity (not shown). Between the conduit section 2 and the shield 7 and between the angled conduit section 3 and the shield 9 are free spaces 10 and 11, respectively. Both of these free spaces are part of the space 117 in FIG. 1, through which cold gas coming from the blower 104 is conducted to the reactor core 102.

A thick apertured plate 12 (corresponding to the apertured plate 113 of FIG. 1) made of metal or a ceramic material, is installed in the angled section 3. The plate 12 has an elliptical cross section (not shown) and exhibits a plurality of circular passages designated as 13. The passages 13 are all of the same diameter and are distributed in a uniform grid 14 over the apertured plate. The number and dimensions of the passages 13 are determined so that the free cross section of the apertured plate 12 amounts to at least 50%.

The apertured plate 12 is built into the angled section 3 of the gas conduit 1 in an oblique position. As shown in FIG. 2, it is inclined by 20° with respect to the horizontal plane. It is arranged so that it covers the largest cross section existing at the point of deflection 4a, 4b, i.e. it extends from 4a to 4b, as shown by 113 in FIG. 1. The circumferential surface 15 and the passages 13 of the apertured plate 12 are aligned parallel to the wall of the angled conduit section 3.

The apertured plate 12 affords an equalization of the flow and temperature profile of the hot gas coming from the reactor core 102 in the angled section 3 of the gas conduit 1. This results in favorable inflow conditions for the steam generator 103 attached to the section 3.

Figure 4:
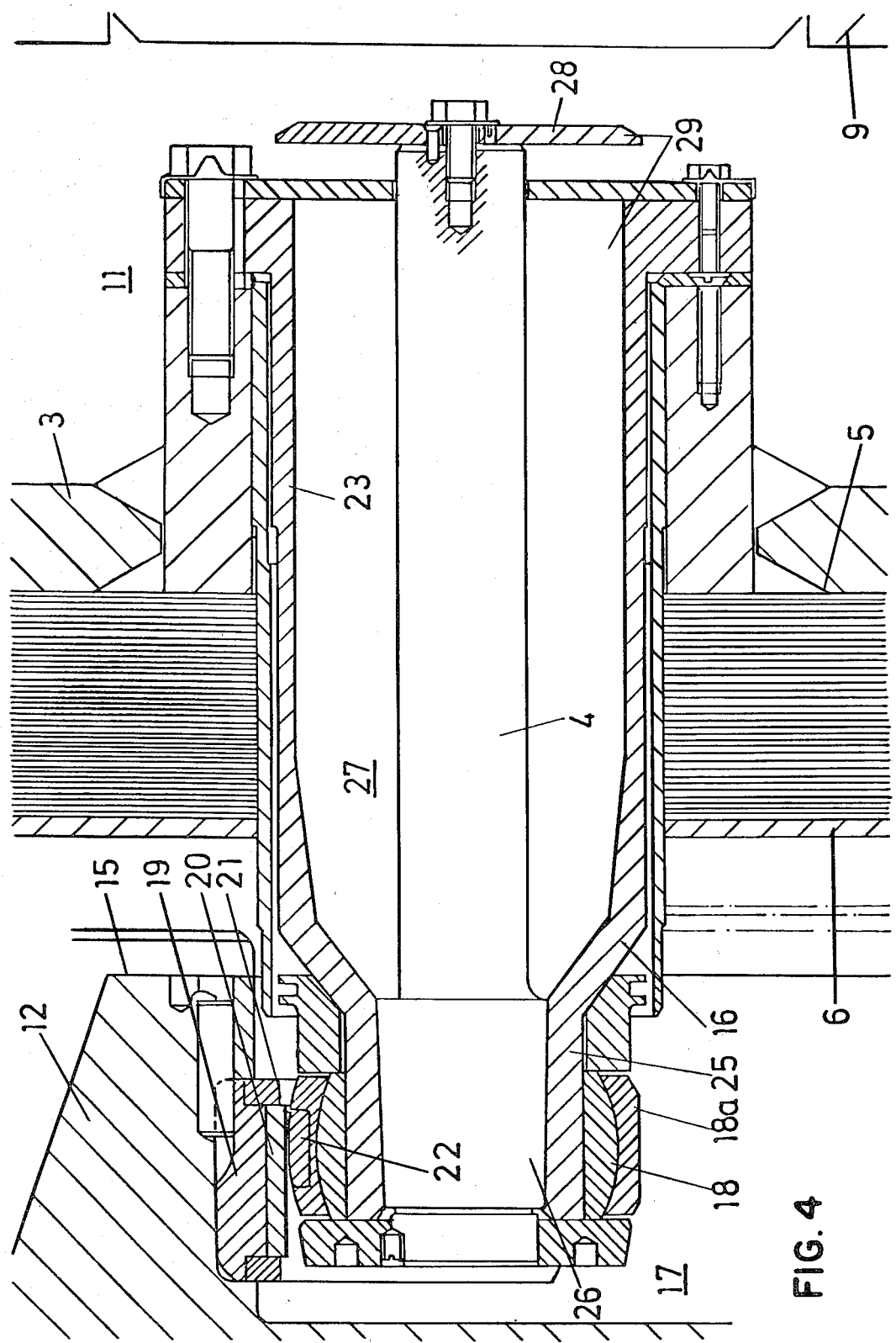
FIG. 4 depicts an enlargement and detail of a supporting bolt arrangement designated by "X" in FIG. 2.

The mounting of the apertured plate 12 is accomplished with supporting bolts 16. Three supporting bolts are shown in FIG. 4, arranged at three points in the wall of the gas conduit 1. The apertured plate 12 has at each of the corresponding locations a projection 17 open in the downward direction in its circumferential surface. The end of each of the supporting bolts 16 fits into one of these projections. A ball joint 18 is located on each of these ends of the supporting bolts.

As shown in FIG. 4, in each recess 17 an insert 19 in the form of a half shell is arranged. The insert comprises a lining of a hard material 20. This hard material is coated with TiC. A similar hard material insert 22 is provided in the external ring of each ball joint 18. It is also coated with TiC in the area 21. The hard material inserts 20 and 22 constitute the friction and sliding points of the mounting of the perforated plate, which by virtue of the design permit sliding movements due to thermal expansion.

Referring further to FIG. 4, each of the three supporting bolts comprise a hollow, cylindrical outer part 23 and a mandrel-like inner part 24 arranged centrally in the outer part 23. The outer parts 23 narrow into a journal 25. The journal 25 rests directly on the ends of 26 of the mandrel-like inner parts 24 and in turn carry the ball joints 18.

Thermal insulation 27 is arranged between the outer part 23 and the inner part 24 of each supporting bolt 16. The thermal insulation is part of a cooling device 29, provided for each of the supporting bolts 16. The cooling device 29 also comprises a cooling plate 28, located at the end facing away from the apertured plate 12 of each mandrel-like inner part 24. The cooling plates 28 are positioned so that they are in the free space 11, through which flows the cold gas from the blower 104. The cold gas carries heat from the ball joints 18 by way of heat transfer at the cooling plates 28 and the mandrel-like inner parts 24, while ball joints are exposed to the hot gas.

The specification and drawings set forth preferred embodiments of the invention. It should be noted, however, that the invention is not limited to those specific embodiments and methods specifically disclosed, but extends instead to all embodiments, substitute and equivalent constructions falling within the scope of the invention as defined by the claims.

What is claimed is:

1. An angled conduit comprising a first conduit part and a second conduit part connected at an angle forming an area of deflection for gas flowing within said conduit parts and means for flowing gas under high pressure and at elevated temperature, said means including an apertured plate mounted at an oblique angle within said conduit in said area of deflection, said apertured plate having a plurality of circular passages for directing the flow of gas in said conduit and being mounted on at least three supporting bolts arranged in the wall of said gas conduit wherein each supporting bolt carries a ball joint on its end and protrudes into a recess open in the downward direction of the circumferential surface of said apertured plate.

2. The angled gas conduit of claim 1 wherein each of said plurality of passages in said apertured plate directs the flow of gas from said first conduit part to said second conduit part in a direction parallel to the direction of said second conduit part.

3. The angled gas conduit of claim 1 wherein said apertured plate is thick in relation to its surface area.

4. The angled gas conduit of claim 1 wherein said apertured plate is arranged to extend the full inner circumference of said deflection area.

5. The angled gas conduit of claim 1 wherein said apertured plate is made of a metallic material.

6. The angled gas conduit of claim 1 wherein said apertured plate is made of ceramic material.

7. The angled gas conduit of claim 1 further comprising internal insulation in its outer circumferential area.

8. The angled gas conduit of claim 1 connecting the hot gas collector space of a gas cooled high temperature nuclear reactor with a component of the cooling gas circuit.

9. The angled gas conduit of claim 1 wherein each of the recesses carries an insert in the shape of a half shell.

10. The angled gas conduit of claim 9 wherein said apertured plate rests on said ball joints.

11. The angled gas conduit of claim 10 wherein each of the half shell shaped inserts and in the recesses a second insert of a hard material is arranged forming a point of support of said apertured plate.

12. The angled gas conduit of claim 11 wherein said hard material inserts are coated with TiC.

13. The angled gas conduit of claim 12 wherein a cooling means is provided for each supporting bolt.

14. The angled gas conduit of claim 13 wherein each supporting bolt comprises a hollow, cylindrical outer part narrowing to a journal for the mounting of the ball joint, and a mandrel-like inner part arranged centrally in the outer part with the journal of the outer part resting upon said inner part.

15. The angled gas conduit of claim 14 wherein thermal insulation is provided between the outer part and the inner part of each supporting bolt.

16. The angled gas conduit of claim 15 wherein said mandrel-like inner part carreis a cooling plate on its end facing away from said apertured plate.

17. The angled gas conduit of claim 16 wherein one end of said conduit is movably arranged.

* * * * *